US011080589B2

(12) United States Patent
Weiss et al.

(10) Patent No.: US 11,080,589 B2
(45) Date of Patent: Aug. 3, 2021

(54) SEQUENCE PROCESSING USING ONLINE ATTENTION

(71) Applicant: Google LLC, Mountain View, CA (US)

(72) Inventors: Ron J. Weiss, New York, NY (US); Thang Minh Luong, Mountain View, CA (US); Peter J. Liu, Santa Clara, CA (US); Colin Abraham Raffel, San Francisco, CA (US); Douglas Eck, Palo Alto, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/504,924

(22) Filed: Jul. 8, 2019

(65) Prior Publication Data

US 2019/0332919 A1 Oct. 31, 2019

Related U.S. Application Data

(63) Continuation of application No. PCT/US2018/017893, filed on Feb. 13, 2018.

(60) Provisional application No. 62/463,570, filed on Feb. 24, 2017.

(51) Int. Cl.
*G06N 3/04* (2006.01)
*G06F 17/16* (2006.01)

(52) U.S. Cl.
CPC .......... *G06N 3/0445* (2013.01); *G06F 17/16* (2013.01); *G06N 3/0481* (2013.01)

(58) Field of Classification Search
CPC ..... G06N 3/0445; G06N 3/0481; G06F 17/16
See application file for complete search history.

(56) References Cited

U.S. PATENT DOCUMENTS 10,332,508 B1* 6/2019 Hoffmeister ........... G06N 3/084

OTHER PUBLICATIONS

Dzmitry Bahdanau, "Neural Machine Translation by Jointly Learning to Align and Translate", 2016 (Year: 2016).*
Aharoni, "Sequence to Sequence Transduction with Hard Monotonic Attention", 2016 (Year: 2016).*

(Continued)

*Primary Examiner* — Ann J Lo
*Assistant Examiner* — Van C Mang
(74) *Attorney, Agent, or Firm* — Fish & Richardson P.C.

(57) ABSTRACT

Methods, systems, and apparatus, including computer programs encoded on a computer storage medium, for generating a target sequence including a respective output at each of multiple output time steps from respective encoded representations of inputs in an input sequence. The method includes, for each output time step, starting from the position, in the input order, of the encoded representation that was selected as a preceding context vector at a preceding output time step, traversing the encoded representations until an encoded representation is selected as a current context vector at the output time step. A decoder neural network processes the current context vector and a preceding output at the preceding output time step to generate a respective output score for each possible output and to update the hidden state of the decoder recurrent neural network. An output is selected for the output time step using the output scores.

20 Claims, 5 Drawing Sheets

(56) References Cited

OTHER PUBLICATIONS

Ekaterina Vylomova, "Word Representation Models for Morphologically Rich Languages in Neural Machine Translation", 2016 (Year: 2016).*
Salimans, "Weight Normalization: A Simple Reparameterization to Accelerate Training of Deep Neural Networks", 2016 (Year: 2016).*
Jan Schluter, "Exploring Data Augmentation for Improved Singing voice detection with Neural Networks", Creative commons attribution 4.0, 2015 (Year: 2015).*
Abadi et al, "TensorFlow: A system for large-scale machine learning" Operating Systems Design and Implementation, 2016, 21 pages.
Aharoni et al, "Sequence to sequence transduction with hard attention," arXiv, Apr. 11, 2017, 12 pages.
Bahdanau et al, "Neural machine translation by jointly learning to align nd translate," arXiv, May 19, 2016, 15 pages.
Bengio et al, "Estimating or propagating gradients through stochastic neurons for conditional computation," arXiv, Aug. 15, 2013, 12 pages.
Cettolo et al, "The IWSLT 2015 evaluation campaign," in International Workshop on Spoken Language Translation, 2015, 13 pages.
Chan et al, "Listen, attend and spell: a neural network for large vocabulary conversational speech recognition," arXiv, Aug. 20, 2015, 16 pages.
Cho et al, "Leanring phrase representations using RNN encoder-decoder for statistical machine translation," arXiv, Sep. 2, 2014, 15 pages.
Chopra et al, "Abstractive sentence summarization with attentive recurrent neural networks," in Proceedings of NAACL-HLT, 2016, 6 pages.
Chorowski et al, "Attention-based models for speech recognition," arXiv, Jun. 24, 2015, 19 pages.
Chorowski et al, "Towards better decoding and language model integration in sequence to sequence models" arXiv, Dec. 2016, 6 pages.
Chung et al, "Empirical evaluation of gated recurrent neural networks on sequence modeling," arXiv, Dec. 11, 2014, 9 pages.
Foerster et al, "Learning to communicate with deep multi-agent reinforcement learning," arXiv, May 24, 2016, 13 pages.
Frey, "Continuous sigmoidal belief networks trained using slice sampling," NIPPS, 1997, 7 pages.
Garofolo et al, "DARPA Timit acoustic-phonetic continuous speech corpus CD-ROM," NIST speech disc 1-1.1, 1993.
Graves et al, "Adaptive computation time for recurrent neural networks," arXiv, Feb. 21, 2017, 19 pages.
Graves et al, "Connectionist temporal classification: labelling unsegmented sequence data with recurrent neural networks," Proceedings of the 23rd ICML, 2006, 8 pages.
Graves et al, "Generating sequence with recurrent neural networks," arXiv, Jun. 5, 2014, 43 pages.
Graves et al, "Neural turing machines," arXiv, Dec. 10, 2014, 26 pages.
Graves et al, "Sequence transduction with recurrent neural networks," arXiv, Nov. 14, 2012, 9 pages.
Grefenstette et al, "Learning to transduce with unbounded memory," arXiv, Nov. 3, 2015, 14 pages.
Guennebaud et al, "Eigen v3," available on or before Jul. 21, 2008, via Internet Archive: Wayback Machine URL<https://web.archive.org/web/20080721221841/http://eigen.tuxfamily.org/index.php?title=Main_Page>, retrieved on Jul. 31, 2019, http://eigen.tuxfamily.org/index.php?title=Main_Page.
Hochrieter et al, "Long short-term memory," Neural Computation, 1997, 32 pages.
Ioffe et al, "Batch normalization: accelerating deep network training by reducing internal covariate shift," ICML, arXiv, Mar. 2, 2015, 11 pages.
Jaitly et al, "A neural transducer," arXiv, Aug. 4, 2016, 10 pages.
Jang et al, "Categorical reparameterization with gumbel-softmax," arXiv, Aug. 5, 2017, 13 pages.
Kim et al, "Structured attention networks," arXiv, Feb. 16, 2017, 21 pages.
Kingma et al, "Adam: A method for stochastic optimization" arXiv, Dec. 2014, 9 pages.
Kong et al, "Segmental recurrent neural networks," arXiv, Mar. 1, 2016, 10 pages.
Ladner et al, "Parellel prefix computation," Journal of the ACM, 1980, 8 pages.
Liu et al, "Text summarization with TensorFlow" Google AI Blog, Aug. 2016, 3 pages.
Luo et al, "Learning online alignments with continuous rewards policy gradient," arXiv.
Luong et al, "Effective approaches to attention-based neural machine translation," arXiv, Sep. 20, 2015, 11 pages.
Luong et al, "Stanford neural machine translation systems for spoken language domain" Internatoinal Workshop on Spoken Language Translation, 2015, 4 pages.
Maddison et al, "A continuous relaxation of discrete random variables," arXiv, Mar. 5, 2017, 20 pages.
Miao et al, "Language as a latent variable: discrete generative models for sentence compression," arXiv, Oct. 14, 2016, 10 pages.
Nallapati et al, "Abstractive text summarization using sequence-to-sequence RNNs and beyond," arXiv, Aug. 26, 2016, 12 pages.
Paul et al, "The design for the wall street journal-based CSR corpus," ACLWeb, 1992, 6 pages.
PCT International Search Report and Written Opinion in International Appln. PCT/US2018/017893, dated May 17, 2018, 16 pages.
Pham et al, "Dropout improves recurrent neural networks for handwriting recognition," arXiv, Mar. 10, 2014, 6 pages.
Raffel et al, "Training a subsampling mechanism in expectation," arXiv, Apr. 8, 2017, 5 pages.
Rush et al, "A neural attention model for abstractive sentence summarization" arXiv, Sep. 2015, 11 pages.
Salakhutdinov et al, "Semantic hashing," Science Direct, 2008, 10 pages.
Salimans et al, "Weight normalization: a simple reparameterization to accelerate training of deep neural networks," arXiv, Jun. 4, 2016, 11 pages.
Sukhbaatar et al, "End-to-end memory networks," arXiv, Nov. 24, 2015, 11 pages.
Sutskever et al, "Sequence to sequence learning with neural networks" Advances in neural information processing systems, 2014, 9 pages.
Suzuki et al, "Cutting-off redundant repeating generations for neural abstractive summarization," arXiv, Feb. 13, 2017, 7 pages.
Vylomova et al, "Word representation models for morphologically rich languages in neural machine translation," arXiv, Jun. 14, 2016, 9 pages.
Wang et al, "Lookahead convolution layer for unidirectional recurrent neural network," ICLR, 2016, 4 pages.
Xu et al, "Show, attend, and tell: neural image caption generation with visual attention," arXiv, Apr. 19, 2016, 22 pages.
Yu et al, "Online segment to segment neural transduction," arXiv, Sep. 26, 2016, 10 pages.
Yu et al, "The neural noisy channel," arXiv, Mar. 6, 2017, 13 pages.
Zaremba et al, "Reinforcement learning neural turing machine," arXIv.
Zeng et al, "Efficient summarization with read-again and copy mechanism," arXiv.
Zhang et al, "Very deep convolutional networks for end-to-end speech recognition," arXiv.
PCT International Preliminary Report on Patentability issued in International Application No. PCT/US2018/017893, dated Sep. 6, 2019, 10 pages.

* cited by examiner

SEQUENCE PROCESSING USING ONLINE ATTENTION

BACKGROUND

This specification relates to generating representations of input sequences using neural networks.

Many data processing tasks involve converting an ordered sequence of inputs into an ordered sequence of outputs. For example, machine translation systems translate an input sequence of words in one language into a sequence of words in another language. As another example, pronunciation systems convert an input sequence of graphemes into a target sequence of phonemes.

Some systems use one or more neural networks to perform a sequence processing task.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that performs sequence processing.

According to a first aspect there is provided a method of generating a target sequence comprising a respective output at each of a plurality of output time steps arranged according to an output order from respective encoded representations of inputs in an input sequence arranged according to an input order, the method comprising: for each output time step after a first output time step in the output order: starting from the position, in the input order, of the encoded representation that was selected as a preceding context vector at a preceding output time step, traversing the encoded representations according to the input order until an encoded representation is selected as a current context vector at the output time step, comprising, for each encoded representation that is traversed: determining a selection probability for the encoded representation from the encoded representation and a hidden state of a decoder recurrent neural network for the preceding output time step, and determining whether to select the encoded representation as the current context vector in accordance with the selection probability; processing the current context vector and a preceding output at the preceding output time step using the decoder recurrent neural network to generate a respective output score for each possible output in a vocabulary of possible outputs and to update the hidden state of the decoder recurrent neural network; and selecting an output at the output time step using the output scores.

In some implementations, the method further comprises: for the first output time step: starting from the first position in the input order, traversing the encoded representations in the input order until an encoded representation is selected as a current context vector at the first output time step, comprising, for each encoded representation: determining a selection probability for the encoded representation from the encoded representation and an initial hidden state of the decoder recurrent neural network, and determining whether to select the encoded representation as the current context vector in accordance with the selection probability; processing the current context vector and a placeholder output using the decoder recurrent neural network to generate a respective output score for each possible output in the vocabulary of possible outputs and to update the initial hidden state; and selecting an output at the first output time step using the output scores.

In some implementations, the method further comprises: in response to determining not to select any of the encoded representations at the positions starting from the position in the input order of the encoded representation that was selected as a preceding context vector at a preceding output time step: using a predetermined context vector as the current context vector at the time step.

In some implementations, determining a selection probability for the encoded representation from the encoded representation and a hidden state of a decoder recurrent neural network for the preceding time step comprises: determining an energy value for the encoded representation by processing the encoded representation and a hidden state of a decoder recurrent neural network for the preceding time step using an energy function; and applying a sigmoid function to the energy value to determine the selection probability.

In some implementations, the sigmoid function is augmented with noise.

In some implementations, the energy value satisfies:

$$a(s_{i-1}, h_j) = g\frac{v^T}{\|v\|}\tanh(Ws_{i-1} + Uh_j + b) + r$$

wherein h is the encoded representation, s is the hidden state, and wherein W and U are weight matrices, v is a weight vector, b is a bias vector, and g and r are scalar parameters that have been learned during training of the decoder recurrent neural network on training data.

In some implementations, the traversing is initiated after an encoder recurrent neural network has started generating the encoded representations but before the encoder recurrent neural network has finished generating the last encoded representation in the input order.

In some implementations, selecting an output at the first output time step using the output scores comprises: selecting a highest-scoring output according to the output scores.

In some implementations, selecting an output at the first output time step using the output scores comprises: sampling from the possible outputs in accordance with the output scores.

In some implementations, the decoder recurrent neural network has been trained using a softly enforced monotonicity between encoded representations and outputs.

In some implementations, the input sequence is a sequence of words in an original language and the output sequence is a sequence of words in an output language that represents the sequence of words in the original language.

In some implementations, the input sequence is a sequence of audio data representing a spoken utterance and the output sequence is a transcription of the spoken utterance.

According to a second aspect there is provided a system comprising one or more computers and one or more storage devices storing instructions that are operable, when executed by the one or more computers, to cause the one or more computers to perform the operations of any implementation of the previously described method.

According to a third aspect, there is provided a computer storage medium encoded with instructions that, when executed by one or more computers, cause the one or more computers to perform the operations of any implementation of the previously described method.

Particular embodiments of the subject matter described in this specification can be implemented so as to realize one or more of the following advantages.

By using the described attention mechanism, the decoder of the sequence processing system as described in this specification operates with a computational complexity given by $\mathcal{O}(\max(T,U))$, where $\mathcal{O}(\cdot)$ is big O notation, T is the input sequence length, and U is the output sequence length. Big O notation indicates a measure of the computational complexity of a process (e.g., the number of arithmetic operations required to complete process), and is therefore a measure of the computational resources (e.g., computing power) that would be required to complete the process. In contrast, decoders of conventional sequence processing systems (using conventional attention mechanisms) operate with a computational complexity given by $\mathcal{O}(TU)$. Therefore, by using the described attention mechanism, the sequence processing system as described in this specification consumes fewer computational resources (e.g., by performing fewer arithmetic operations) while processing an input sequence to generate a corresponding output sequence than used by conventional sequence processing systems using conventional attention mechanisms. Moreover, in many cases the sequence processing system as described in this specification has a similar accuracy to conventional sequence processing systems despite consuming fewer computational resources. The accuracy of a sequence processing system refers to the similarity between the output generated by the sequence processing system in response to processing an input and a target (i.e., preferred) output corresponding to the input.

The sequence processing system as described in this specification can start generating outputs of the output sequence before the entire input sequence has been received. Specifically, by using the described attention mechanism, the decoder of the sequence processing system as described in this specification can start generating outputs of the output sequence before all of the encoded representations of the inputs of the input sequence are available. In contrast, conventional sequence processing systems (using conventional attention mechanisms) cannot start generating outputs of the output sequence until the entire input sequence has been received. Therefore, unlike conventional sequence processing systems, the sequence processing system as described in this specification can perform sequence processing online, which is desirable in applications such as speech recognition and machine translation.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
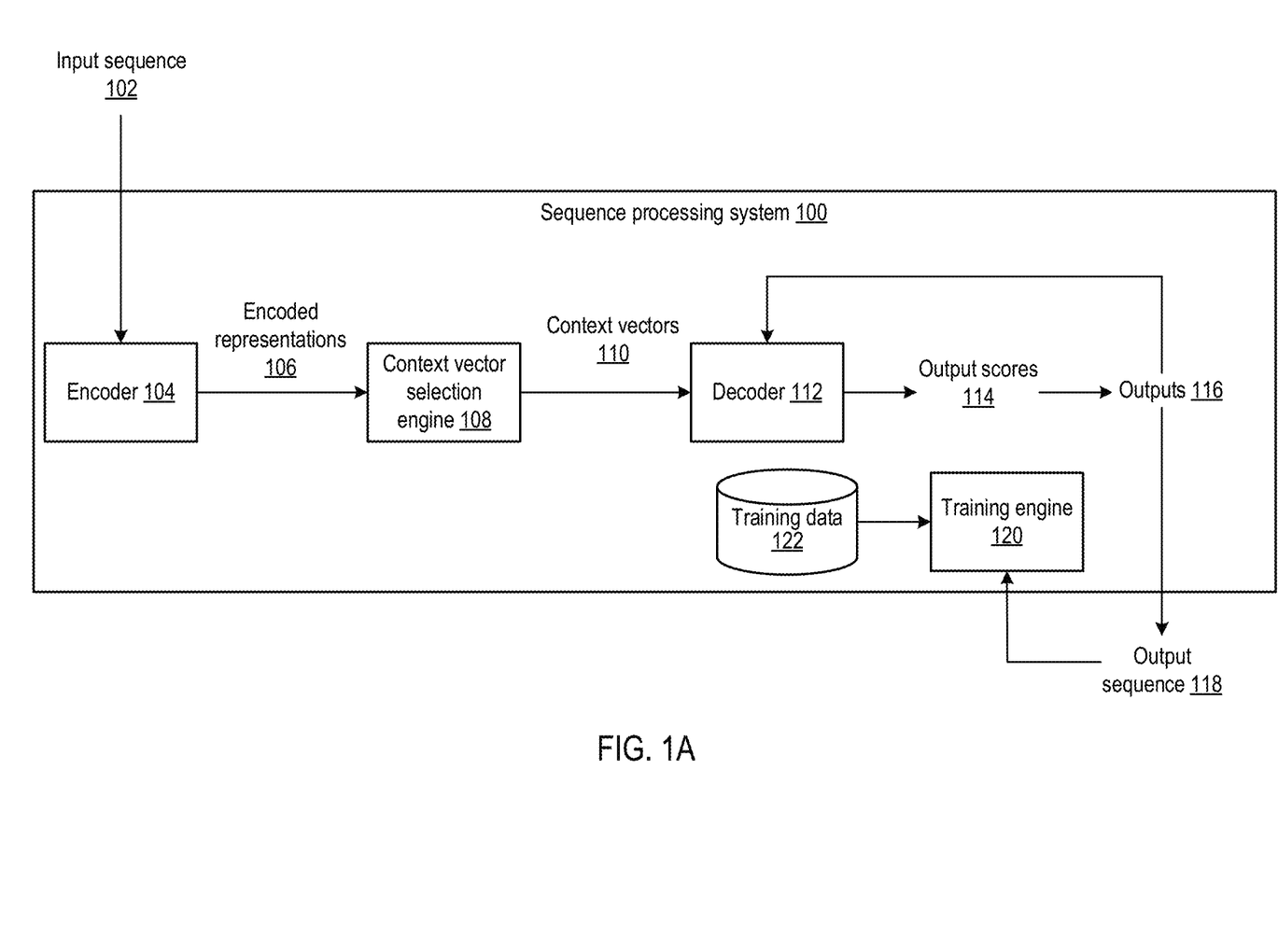
FIG. 1A shows an example sequence processing system.

FIG. 1A shows an example sequence processing system 100. The sequence processing system 100 is an example of a system implemented as computer programs on one or more computers in one or more locations in which the systems, components, and techniques described below are implemented.

The system 100 processes an input sequence 102 to generate an output sequence 118 for the input sequence 102. The input sequence 102 includes a respective input at each of multiple input time steps and the output sequence 118 includes a respective output at each of multiple output time steps.

For example, the system 100 may be a neural machine translation system. That is, if the input sequence 102 is a sequence of words in an original language, e.g., a sentence or phrase, the output sequence 118 may be a translation of the input sequence 102 into an output language, i.e., a sequence of words in the output language that represents the sequence of words in the original language.

As another example, the system 100 may be a speech recognition system. That is, if the input sequence 102 is a sequence of audio data representing a spoken utterance, the output sequence 118 may be a sequence of graphemes, characters, or words that represents the utterance, i.e., is a transcription of the input sequence 102.

As another example, the system 100 may be a natural language processing system. For example, if the input sequence 102 is a sequence of words in an original language, e.g., a sentence or phrase, the output sequence 118 may be a summary of the input sequence 102 in the original language, i.e., a sequence that has fewer words than the input sequence 102 but that retains the essential meaning of the input sequence 102. As another example, if the input sequence 102 is a sequence of words that form a question, the output sequence 118 can be a sequence of words that form an answer to the question.

As another example, the system 100 may be part of a computer-assisted medical diagnosis system. For example, the input sequence 102 can be a sequence of data from an electronic medical record and the output sequence 118 can be a sequence of predicted treatments.

Each respective input of each input time step of the input sequence 102 is an ordered collection of numerical values (e.g., a vector or a matrix) representing an element of an input vocabulary. For example, the input vocabulary may consist of graphemes, characters, word pieces, words, or audio data fragments. In some cases, each input is a predetermined representation of an input from the input vocabulary. For example, each input may be a one-hot vector representation of an input from the input vocabulary (i.e., a vector with a different entry for each input of the input vocabulary, where the entry corresponding to the represented input is one and the rest of the entries are zeros). In some cases, the representations of the inputs of the input vocabulary are generated by an input embedding engine in accordance with input embedding engine parameters that are jointly trained (as will be described below) with the other learnable parameters of the system 100.

The system 100 includes an encoder 104 that is configured to process the input sequence 102 in accordance with values of a set of encoder parameters to generate as output a sequence of encoded representations 106. Each encoded representation of the sequence of encoded representations 106 is an ordered collection of numerical values (e.g., a vector or a matrix) that represents one or more of respective inputs of the input sequence 102.

In some implementations, the encoder 104 is a recurrent neural network (e.g., a long-short term memory network) that is configured to sequentially process the respective inputs of the input sequence over the multiple input time steps, and for each input time step, to update the internal state of the recurrent neural network and to generate as output an encoded representation of the input for the input time step. In some implementations, the encoder 104 is a convolutional neural network that is configured to jointly process the respective inputs of the input sequence to generate as output encoded representations of the inputs of the input sequence.

In some implementations, the encoder 104 generates a fixed number of encoded representations (i.e., that is independent of the number of respective inputs of the input sequence 102). In some implementations, the encoder 104 generates a variable number of encoded representations. For example, the encoder 104 may generate a number of encoded representations that is equal to the number of respective inputs of the input sequence 102, and each of the encoded representations may represent a different input of the input sequence 102.

The system 100 includes a context vector selection engine 108 that is configured to, at each output time step, determine a context vector 110 for the output time step. Each context vector 110 is an ordered collection of numerical values (e.g., a vector or matrix).

After the system 100 is trained, at each output time step, the context vector selection engine 108 selects a particular encoded representation of the sequence of encoded representations 106 to be the context vector 110 for the time step. The encoded representations selected by the context vector selection engine 108 as the context vectors at each of the output time steps satisfy a monotonicity constraint. Specifically, the context vector selection engine 108 selects the context vectors 110 so that, for each output time step, the position of the encoded representation (i.e., in the sequence of encoded representations 106) selected by the context vector selection engine 108 as the context vector 110 for the output time step is either: (i) the same as the position of the encoded representation selected as the context vector 110 for the previous output time step, or (ii) after the position of the encoded representation selected as the context vector 110 for the previous output time step. An example process for generating a context vector for an output time step after the sequence processing system is trained is described with reference to FIG. 3.

The system 100 includes a decoder 112 that is a recurrent neural network (e.g., a long short-term memory network) configured to process (i) the context vector 110 for the output time step and (ii) the output generated by the system 100 for the previous output time step, to generate output scores 114 and to update the hidden state of the decoder 112. The output scores 114 are an ordered collection of numerical values (e.g., a vector) including a respective score for each output of an output vocabulary. For example, the output vocabulary may consist of graphemes, characters, word pieces, or words.

An example of an encoder and a decoder is described in Kyunghyun Cho, et al., "Learning phrase representations using RNN encoder-decoder for statistical machine translation," Conference on Empirical Methods in Natural Language Processing (EMNLP), 2014.

The system 100 selects an output 116 (i.e., an element of the output vocabulary) for the output time step based on the output scores 114 for the output time step. In some implementations, the system 100 selects the output for the output time step that has the highest output score. In some implementations, the system 100 determines a probability distribution over the output vocabulary using the output scores (e.g., by processing the output scores using a softmax function) and selects the output for the output time step by sampling from the determined probability distribution.

In response to selecting an end-of-sequence symbol (i.e., a symbol in the output vocabulary that is understood to indicate that the symbol is the last symbol of a sequence) for an output time step, the system 100 determines the ordered concatenation of the outputs 116 determined for the output time steps to be the output sequence 116.

The system 100 includes a training engine 120. The training engine 120 is configured to train the system 100 based on training data 122. The training data 122 includes multiple training examples. Each training example includes an input sequence 102 and a corresponding target sequence. The target sequence corresponding to an input sequence 102 indicates the output sequence 118 that should be generated by the system 100 by processing the corresponding input sequence 102.

The training engine 120 trains the system 100 by providing input sequences of training examples of the training data 122 to the system 100 to generate corresponding output sequences. The training engine backpropagates gradients of a loss function to adjust the values of the parameters of the system 100 (e.g., the parameters of the encoder 104, the decoder 112, and the context vector selection engine 108). In general, the training engine 120 adjusts the values of the parameters of the system 100 to cause the system 100 to generate output sequences for corresponding input sequences that are more similar to the target sequences corresponding to the input sequences (as specified by the training data 122). For example, the loss function may be a sum of cross-entropy losses between the output scores generated by the system 100 for each output time step and the respective outputs of the target sequence specified by the training data 122 (e.g., represented as one-hot vectors). The training engine 120 can train the system 100 using any appropriate training technique, such as stochastic gradient descent.

The process by which the context vector selection engine 108 determines the context vectors 110 after the system 100 is trained (as described above) is not differentiable (since it is a discrete selection process). While the system 100 is being trained, the context vector selection engine 108 determines the context vectors 110 according to a different, differentiable process, to allow the training engine 120 to calculate and backpropagate gradients.

Specifically, when the system 100 is being trained, at each output time step, the context vector selection engine 108 determines the context vector 110 for the output time step to be the expected value of a context vector selected in accordance with the discrete context vector selection process used by the context vector selection engine 108 after the system 100 is trained. At each output time step, the context vector selection engine 108 determines a weighting factor for each encoded representation of the sequence of encoded representations 106, and determines the context vector 110 for the output time step to be the linear combination of the encoded representations weighted in accordance with the corresponding weighting factors. An example process for generating a context vector for an output time step when the sequence processing system is being trained is described with reference to FIG. 4.

Figure 1B:
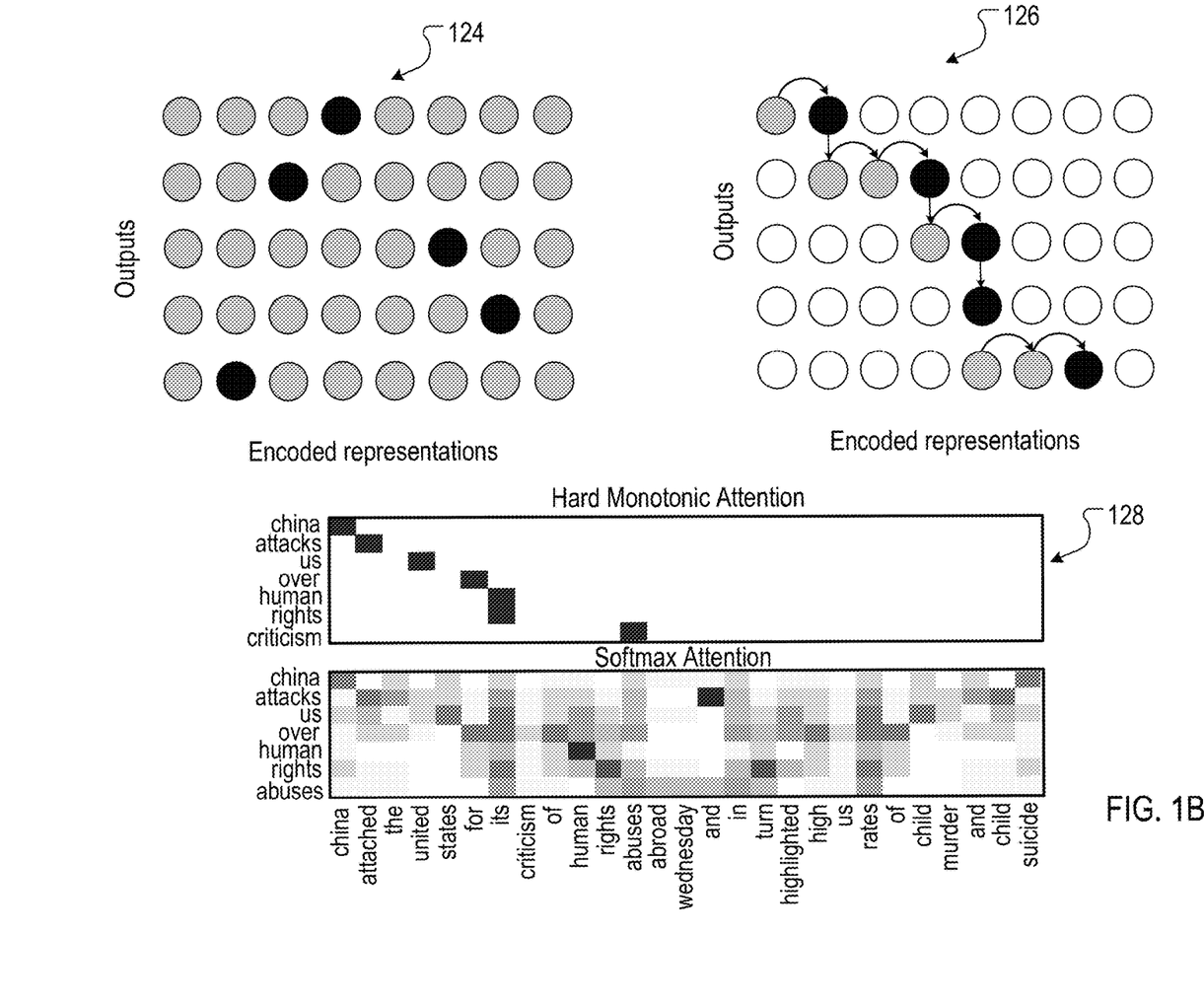
FIG. 1B is an illustration of the operation of: (i) a conventional softmax-based attention decoder, and (ii) a trained decoder as described in this specification.

FIG. 1B is an illustration of the operation of: (i) a conventional softmax-based attention decoder, and (ii) a trained decoder as described in this specification (e.g., the decoder 112).

An illustration of the operation of a conventional softmax-based attention decoder is depicted in 124. For each output (on the vertical axis), the conventional decoder inspects each encoded representation (on the horizontal axis). Each gray node corresponds to an encoded representation that is inspected by the conventional decoder while generating the corresponding output. Each black node corresponds to an encoded representation that the conventional encoder identifies as most relevant (e.g., weights most heavily) in determining a context vector to generate the corresponding output. For each output, the conventional decoder inspects each encoded representation. There is no dependence between the output time step and which encoded representation the conventional encoder identifies as most relevant in determining a context vector to generate the corresponding output.

An illustration of the operation of a trained decoder as described in this specification (e.g., the decoder 112) is depicted in 126. For each output (on the vertical axis), the decoder inspects encoded representations (on the horizontal axis, depicted in gray) from left-to-right starting from where it left off at the previous output time step and chooses a single one (indicated in black) to determine a context vector to generate the corresponding output. White nodes indicate that, in determining a context vector to generate the corresponding output, the decoder did not inspect the corresponding encoded representation because it violates monotonicity (as described earlier). Arrows indicate the order of processing and dependence between encoded representations and outputs. Due to the monotonicity constraint, for each output, the trained decoder as described in this specification inspects far fewer encoded representations and therefore operate with a much lower computational complexity.

An example of the operation of a trained decoder as described in this specification for a particular input and output sequence is depicted in the top panel of 128. In this example, the sequence processing system is configured to, for any input sequence, generate an output sequence that summarizes the input sequence. In this case, the input sequence (on the horizontal axis) is: "China attacked the United States for its criticism of human rights abuses abroad Wednesday and in turn highlighted high U.S. rates of child murder and child suicide". The corresponding output sequence generated by the decoder as described in this specification (on the vertical axis in the top panel of 128) is "China attacks U.S. over human rights criticism". Black rectangles indicate that the decoder used the encoded representation of the corresponding word of the input sequence to determine a context vector to generate the corresponding output (and white squares indicate otherwise).

An example of the operation of a conventional decoder for the same input sequence (as previously described) is depicted in the bottom panel of 128. In this example, the corresponding output sequence generated by the conventional decoder (on the vertical axis in the bottom panel of 128) is "China attacks U.S. over human rights abuses". The shade of each rectangle indicates the weighting factor assigned by the decoder to the encoded representation of the corresponding word of the input sequence to determine a context vector to generate the corresponding output (where the shade black indicates 1 and the shade white indicates 0).

Figure 2:
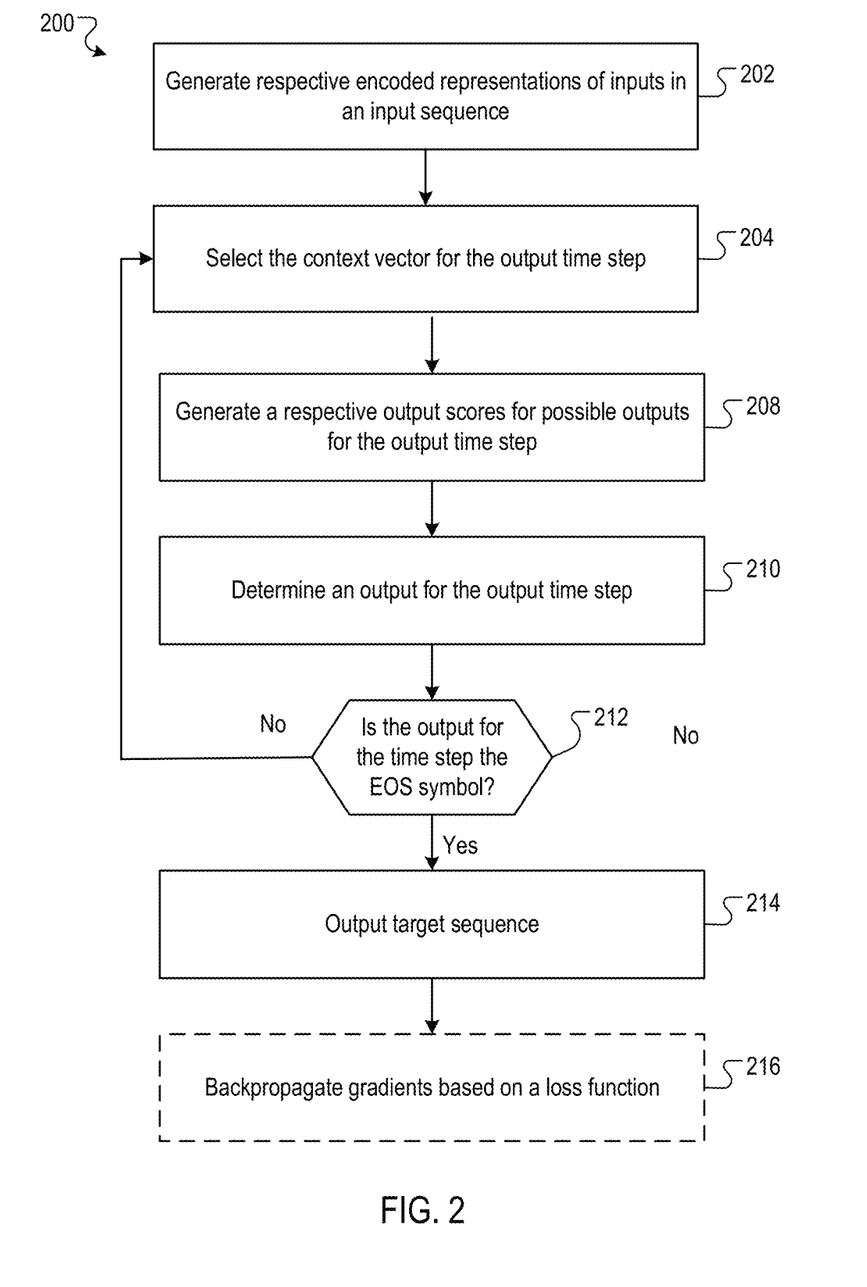
FIG. 2 is a flow diagram of an example process for generating an output sequence using a sequence processing system.

FIG. 2 is a flow diagram of an example process for generating an output sequence using a sequence processing system. For convenience, the process 200 will be described as being performed by a system of one or more computers located in one or more locations. For example, a sequence processing system, e.g., the sequence processing system 100 of FIG. 1, appropriately programmed in accordance with this specification, can perform the process 200.

The process 200 is an example process for generating an output sequence by generating a respective output at each of multiple output time steps. The process 200 can be naturally generalized to the setting of beam search decoding, where the system maintains a set of candidate output sequences that are updated at each time step based on the output scores generated for the time step, and eventually selects a particular candidate output sequence having the highest score (e.g., according to the product of the output scores for each output time step or a product of logarithms of the output scores for the output time steps).

The system uses an encoder to process the input sequence in accordance with values of a set of encoder parameters to generate as output a sequence of encoded representations (202).

The input sequence includes a respective input at each of multiple input time steps. Each respective input of each input time step of the input sequence is an ordered collection of numerical values (e.g., a vector or a matrix). Each respective input is a representation of an input from an input vocabulary, where the input vocabulary may consist of graphemes, characters, word pieces, words, or audio data. In some cases, each input is a predetermined representation of an input from the input vocabulary. For example, each input may be a one-hot vector representation of an input from the input vocabulary. In some cases, the representations of the inputs of the input vocabulary are generated by an input embedding engine in accordance with input embedding engine parameters that are jointly trained with the other learnable parameters of the system.

Each of encoded representations is an ordered collection of numerical values (e.g., a vector or a matrix) that represents one or more of respective inputs of the input sequence. In some implementations, the encoder generates a fixed number of encoded representations (i.e., that is independent of the number of respective inputs of the input sequence). In some implementations, the encoder generates a variable number of encoded representations.

In some implementations, the encoder is a recurrent neural network (e.g., a long short-term memory network). In some implementations, the encoder is a convolutional neural network.

In general, the system can proceed to the next steps in the process 200 (i.e., 204, 208, 210, and 212) and start generating outputs for the output time steps before the system has finished generated each encoded representation in the sequence of encoded representations.

The system selects the context vector for the output time step using the context vector selection engine (204). The context vector for the output time step is an ordered collection of numerical values (e.g., a vector or matrix). The context vector selection engine operates in one of two different modes of operation, depending on whether the system is being trained. A first mode of operation, that applies after the system is trained, is described with reference to FIG. 3. A second mode of operation, that applies when the system 100 is being trained, is described with reference to FIG. 4.

The system uses a decoder (which is a recurrent neural network, for example, a long short-term memory network) to process (i) the context vector for the output time step and (ii) the output generated by the system at the previous output time step, to generate output scores and to update the hidden state of the decoder (208). If the current output time step is the first output time step, then instead of processing an output generated by the system at the previous output time step, the decoder processes a predetermined placeholder output (e.g., a start-of-sequence symbol). The output generated by the system at the previous output time step is a representation of an output from an output vocabulary, where the output vocabulary may consist of graphemes, characters, word pieces, words, or audio data. In some cases, each output is a predetermined representation of an output from the output vocabulary. For example, each output may be a one-hot vector representation of an output from the output vocabulary. In some cases, the representations of the outputs of the output vocabulary are generated by an output embedding engine in accordance with output embedding engine parameters that are jointly trained with the other learnable parameters of the system.

The output scores are an ordered collection of numerical values (e.g., a vector) including a respective score for each output of the output vocabulary.

The system determines an output (i.e., from the output vocabulary) for the output time step (210). In some implementations, the system selects the output for the output time step that has the highest output score. In some implementations, the system determines a probability distribution over the output vocabulary using the output scores (e.g., by processing the output scores using a softmax function) and selects the output for the output time step by sampling from the determined probability distribution.

If the output for the output time step is not an end-of-sequence symbol (212), then the system returns to 204 and repeats the preceding steps.

If the output for the output time step is an end-of-sequence symbol (212), then the system determines the ordered concatenation of the outputs determined for the output time steps to be the output sequence corresponding to the input sequence (214).

After the system determines the output sequence (e.g., as in 214), if the system is being trained, the training engine may backpropagate gradients of the loss function (216) to adjust the values of the parameters of the components of the system (e.g., the parameters of the encoder, the decoder, and the context vector selection engine). In general, the training engine adjusts the values of the parameters of the components of the system to cause the system to generate output sequences for corresponding input sequences that are more similar to the target sequences corresponding to the input sequences (as specified by the training data). For example, the loss function may be a sum of cross-entropy losses between the output scores generated by the system for each output time step and the respective outputs of the target sequence specified by the training data (e.g., represented as one-hot vectors).

Figure 3:
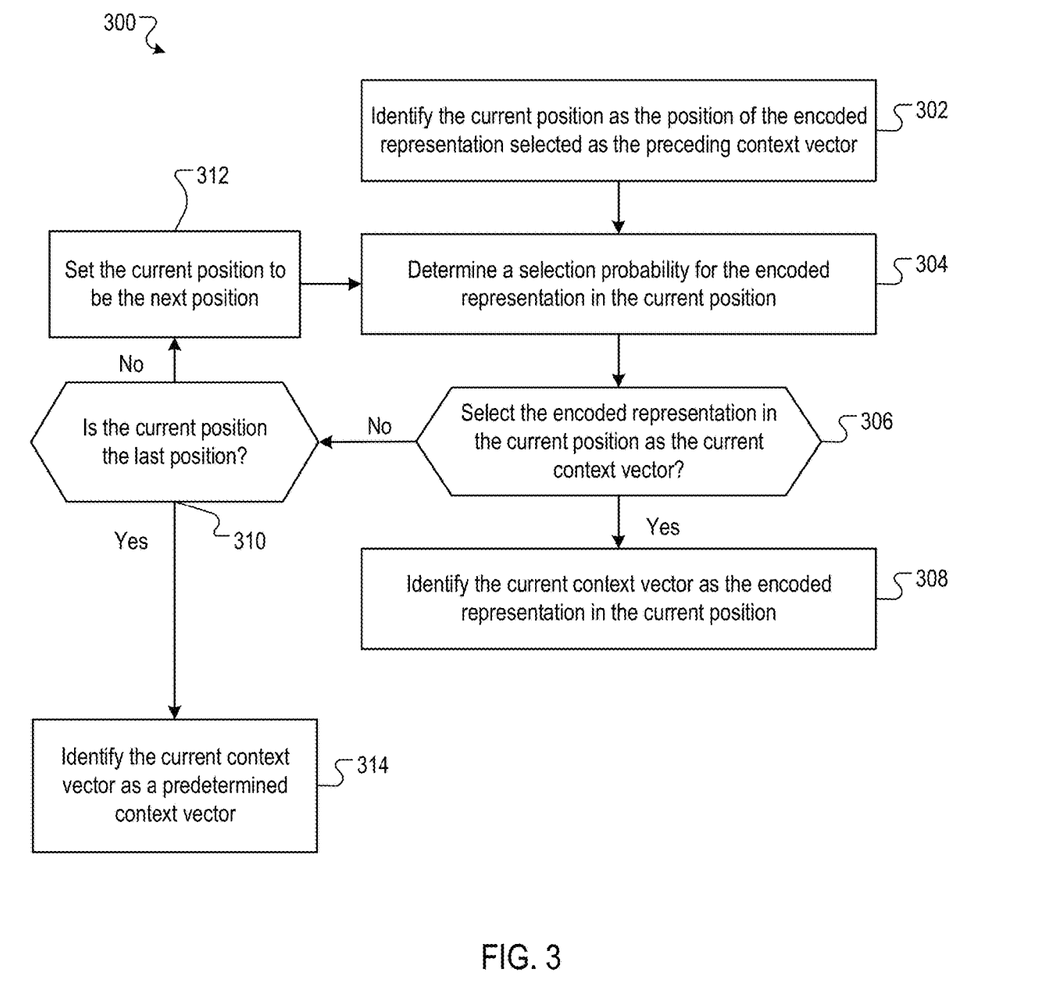
FIG. 3 is a flow diagram of an example process for generating a context vector for an output time step after the sequence processing system is trained.

FIG. 3 is a flow diagram of an example process for generating a context vector for an output time step after the sequence processing system is trained. For convenience, the process 300 will be described as being performed by a system of one or more computers located in one or more locations. For example, a sequence processing system, e.g., the sequence processing system 100 of FIG. 1, appropriately programmed in accordance with this specification, can perform the process 300.

The system identifies the current position in the sequence of encoded representations (302). If the current output time step, i.e., the output time step for which the output is currently being generated, is not the first output time step, the system determines the current position to be the position of the encoded representation selected by the system as the context vector for the previous output time step. If the current output time step is the first output time step, then the system determines the current position in the sequence of encoded representations to be the first position in the sequence of encoded representations.

The system determines a selection probability for the encoded representation in the current position in the sequence of encoded representations (304).

Specifically, the system determines an energy value for the encoded representation in the current position by providing (i) the encoded representation in the current position and (ii) the hidden state of the decoder recurrent neural network for the previous output time step as input to an energy function that is configured to process the inputs to generate as output an energy value. In general, the energy value is a scalar value. The energy value for the encoded representation in the current position may be given by:

$$e = g\frac{v^T}{|v|}\tanh(Ws + Uh + b) + r,$$

where h is the encoded representation in the current position, s is the hidden state of the decoder recurrent neural network for the previous output time step, W and U are weight matrices, v and b are weight vectors, and g and r are scalar parameters. The values of the weight matrices, the weight vectors, and the scalar parameters are discriminatively learned during training. The system determines the selection probability for the encoded representation in the current position by applying a sigmoid function to the determined energy value, i.e.:

$$p = \sigma(e),$$

where σ is the sigmoid function and e is the determined energy value.

In some implementations, the system selects the encoded representation in the current position in the sequence of encoded representations as the current context vector with a probability given by the determined selection probability for the encoded representation in the current position (306). In some implementations, the system selects the encoded representation in the current position in the sequence of encoded representations as the current context vector if the determined selection probability for the encoded representation in the current position exceeds a predetermined threshold.

If the system selects the encoded representation in the current position in the sequence of encoded representations as the current context vector (308), then the process concludes.

If the system does not select the encoded representation in the current position in the sequence of encoded representations as the current context vector, then the system determines whether the current position is the last position in the sequence of encoded representations (310). In response to determining that the current position in the sequence of encoded representations is not the last position, the system sets the current position to be the next position in the sequence of encoded representations, and returns to 304. In response to determining that the current position is the last position in the sequence of encoded representations, the system identifies the current context vector to be a predetermined vector (314).

Generating a context vector for an output time step by the process 300 causes the position of the encoded representation selected as the context vector for the output time step to be either: (i) the same as the position of the encoded representation selected as the context vector for the previous output time step, or (ii) after the position of the encoded representation selected as the context vector for the previous output time step.

Figure 4:
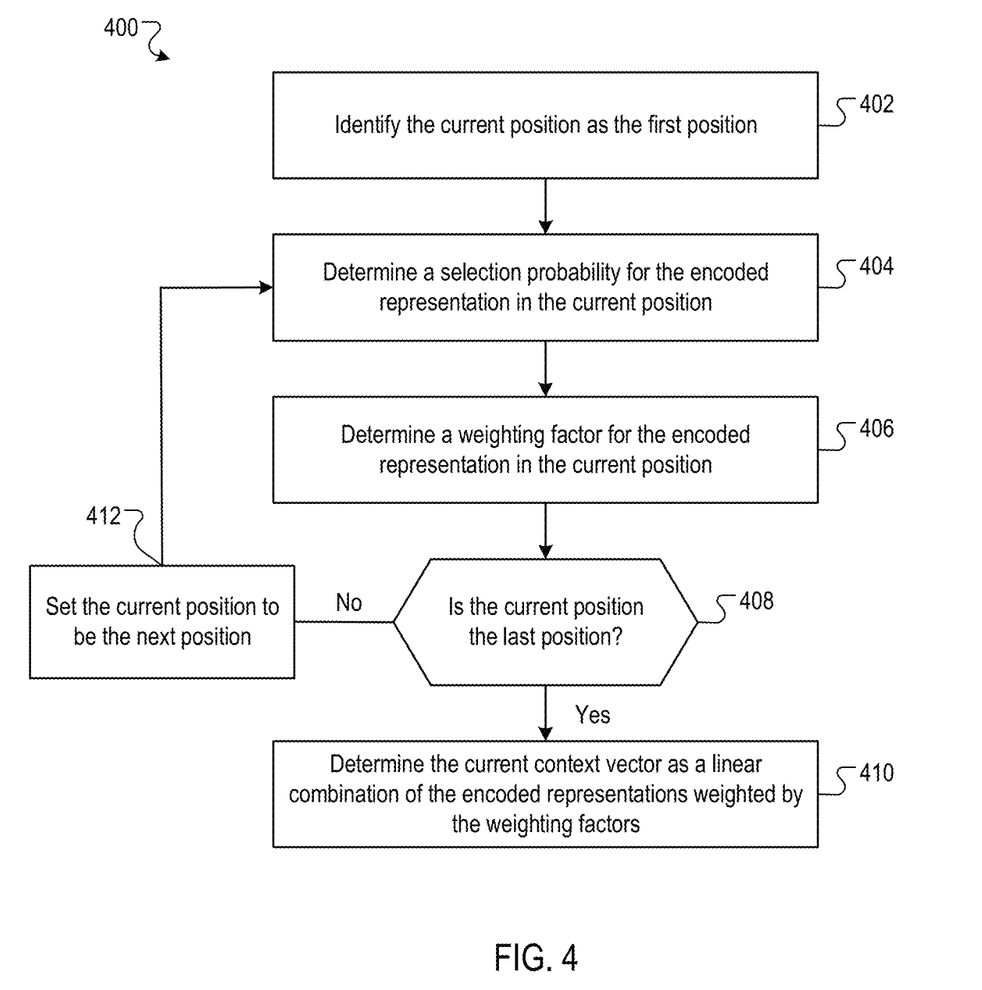
FIG. 4 is a flow diagram of an example process for generating a context vector for an output time step when the sequence processing system is being trained.

FIG. 4 is a flow diagram of an example process for generating a context vector for an output time step when the sequence processing system is being trained. For convenience, the process 400 will be described as being performed by a system of one or more computers located in one or more locations. For example, a sequence processing system, e.g., the sequence processing system 100 of FIG. 1, appropriately programmed in accordance with this specification, can perform the process 400.

The system identifies the current position in the sequence of encoded representations to be the first position in the sequence of encoded representations (402).

The system determines a selection probability for the encoded representation in the current position in the sequence of encoded representations (404). The system performs the same process as described with reference to 304, but includes an additional step of adding noise (e.g., a Gaussian random variable with zero mean and fixed variance) to the energy value prior to determining the selection probability by applying a sigmoid function to the energy value, i.e.:

$$p = \sigma(e+N),$$

where $\sigma$ is the sigmoid function, e is the determined energy value, and N is a random noise variable. By adding noise to the energy value prior to determining the selection probability, the parameters of the components of the system (e.g., the parameters of the energy function) are more likely to be adjusted during training by the training engine to cause the determined selection probabilities to be near zero or one. When the selection probabilities of the encoded representations are near zero or one, the context vectors generated by the context vector selection process 400 during training are similar to the context vectors generated by the discrete context vector selection process 300 after training. Therefore, training the system based on context vectors generated by the context vector selection process 400 improves the performance of the system even after training, when the context vectors are selected by the discrete context vector selection process 300.

The system determines a weighting factor for the encoded representation in the current position in the sequence of encoded representations (406). The weighting factor represents the likelihood that, given the selection probabilities determined for the encoded representations for the previous output time steps, the encoded representation in the current position would be selected as the current context vector if the context vectors for each of the output time steps were selected in accordance with the process 300. Specifically, the system determines the weighting factor by the recursive relationship:

$$q_{i,j} = (1 - p_{i,j-1})q_{i,j-1} + \alpha_{i-1,j},$$

$$\alpha_{i,j} = p_{i,j} q_{i,j},$$

where i is the current output time step, j is the current position in the sequence of encoded representations, i−1 is the previous output time step, j−1 is the previous position in the sequence of encoded representations, $q_{i,j}$ is a latent variable for output time step i and position j in the sequence of encoded representations, $\alpha_{i,j}$ is the weighting factor for output time step i and position j in the sequence of encoded representations, and $p_{i,j}$ is the selection probability for output time step i and position j in the sequence of encoded representations. The base cases of the recursive relationship are given by:

$$\alpha_{0,j} = \delta_j \text{ for } j \in \{1, \ldots, T\},$$

$$p_{i,0} = 0 \text{ for } i \in \{1, \ldots, R\},$$

$$q_{i,0} = 0 \text{ for } i \in \{1, \ldots, R\},$$

where T is the number of encoded representations in the sequence of encoded representations, R is the number of output time steps, and $\delta_j$ is a delta function given by:

$$\delta_j = \begin{cases} 0 \text{ if } j \neq 0 \\ 1 \text{ if } j = 0 \end{cases}$$

The system determines if the current position in the sequence of encoded representations is the last position in the sequence of encoded representations (408).

In response to determining that the current position in the sequence of encoded representations is the last position in the sequence of encoded representations, the system determines the context vector for the current output time step as a linear combination of the encoded representations weighted by the determined weighting factors, i.e.:

$$c_i = \sum_{j=1}^{T} \alpha_{i,j} h_j,$$

where $c_i$ is the context vector for the current output time step, $\{\alpha_{i,j}\}$ are the weighting factors (as described above), and $\{h_j\}$ are the encoded representations, and T is the number of encoded representations in the sequence of encoded representations (410).

In response to determining that the current position in the sequence of encoded representations is not the last position in the sequence of encoded representations, the system sets the current position to be the next position in the sequence of encoded representations, returns to 404, and repeats the preceding steps (412).

The process 400 describes a method for generating context vectors for output time steps that is both differentiable, thereby enabling the training engine to jointly train the components of the system by gradient backpropagation, and that mimics the discrete context vector generation process 300, by causing the selection probabilities to be near zero or one (see 404). Training the system based on context vectors generated by the process 400 therefore enhances the performance of the system (e.g., its prediction accuracy) even when the context vectors are selected by the discrete context vector generation process 300 (as they are after the system is trained).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of generating a target sequence comprising a respective output at each of a plurality of output time steps arranged according to an output order from respective encoded representations of inputs in an input sequence arranged according to an input order, the method comprising:

for each output time step after a first output time step in the output order, selecting an output at the output time step using monotonic attention over the encoded representations of the inputs, comprising:
starting from a position, in the input order, of the encoded representation that was selected as a preceding context vector at a preceding output time step, sequentially traversing the encoded representations according to the input order until an encoded representation is selected as a current context vector at the output time step, comprising, for each encoded representation that is sequentially traversed:
determining a selection probability for the encoded representation from the encoded representation and a hidden state of a decoder recurrent neural network for the preceding output time step;
determining whether to select the encoded representation as the current context vector in accordance with the selection probability; and
if the encoded representation is not selected as the current context vector, proceeding to a next encoded representation according to the input order;
after sequentially traversing the encoded representations to select the current context vector at the output time step:
processing the current context vector and a preceding output at the preceding output time step using the decoder recurrent neural network to generate a respective output score for each output in a vocabulary of outputs and to update the hidden state of the decoder recurrent neural network; and
selecting the output at the output time step using the output scores;

wherein for one or more of the output time steps, sequentially traversing the encoded representations comprises:
sequentially traversing multiple encoded representations before an encoded representation is selected as the current context vector at the output time step,
wherein the encoded representation that is selected as the current context vector at the output time step is separated from the encoded representation that was selected as the preceding context vector at the preceding output time step by at least one intervening encoded representation in the input sequence.

2. The method of claim 1, further comprising:
for the first output time step:
starting from a first position in the input order, sequentially traversing the encoded representations in the input order until an encoded representation is selected as a current context vector at the first output time step, comprising, for each encoded representation that is sequentially traversed:
determining a selection probability for the encoded representation from the encoded representation and an initial hidden state of the decoder recurrent neural network;
determining whether to select the encoded representation as the current context vector in accordance with the selection probability; and
if the encoded representation is not selected as the current context vector, proceeding to a next encoded representation according to the input order;
processing the current context vector and a placeholder output using the decoder recurrent neural network to generate a respective output score for each output in the vocabulary of outputs and to update the initial hidden state; and
selecting an output at the first output time step using the output scores.

3. The method of claim 1, further comprising:
in response to determining not to select any of the encoded representations at positions starting from the position in the input order of the encoded representation that was selected as a preceding context vector at a preceding output time step:
using a predetermined context vector as the current context vector at the time step.

4. The method of claim 1, wherein:
determining a selection probability for the encoded representation from the encoded representation and a hidden state of a decoder recurrent neural network for the preceding time step comprises:
determining an energy value for the encoded representation by processing the encoded representation and a hidden state of a decoder recurrent neural network for the preceding time step using an energy function; and
applying a sigmoid function to the energy value to determine the selection probability.

5. The method of claim 4, wherein the sigmoid function is augmented with noise.

6. The method of claim 4, wherein the energy value satisfies:

$$a(s_{i-1}, h_j) = g\frac{v^T}{\|v\|}\tanh(Ws_{i-1} + Uh_j + b) + r$$

wherein h is the encoded representation, s is the hidden state, and wherein W and U are weight matrices, v is a weight vector, b is a bias vector, and g and r are scalar parameters that have been learned during training of the decoder recurrent neural network on training data.

7. The method of claim 1, wherein the traversing is initiated after an encoder recurrent neural network has started generating the encoded representations but before the encoder recurrent neural network has finished generating the last encoded representation in the input order.

8. The method of claim 1, wherein selecting the output at the output time step using the output scores comprises:
selecting a highest-scoring output according to the output scores.

9. The method of claim 1, wherein selecting the output at the output time step using the output scores comprises:
sampling from the vocabulary of outputs in accordance with the output scores.

10. The method of claim 1, wherein the decoder recurrent neural network has been trained using a softly enforced monotonicity between encoded representations and outputs.

11. The method of claim 1, wherein the input sequence is a sequence of words in an original language and the output sequence is a sequence of words in an output language that represents a translation of the sequence of words in the original language.

12. The method of claim 1, wherein the input sequence is a sequence of audio data representing a spoken utterance and the output sequence is a transcription of the spoken utterance.

13. A system comprising one or more computers and one or more storage devices storing instructions that are operable, when executed by the one or more computers, to cause the one or more computers to perform operations to generate a target sequence comprising a respective output at each of a plurality of output time steps arranged according to an output order from respective encoded representations of inputs in an input sequence arranged according to an input order, the operations comprising:
for each output time step after a first output time step in the output order, selecting an output at the output time step using monotonic attention over the encoded representations of the inputs, comprising:
starting from a position, in the input order, of the encoded representation that was selected as a preceding context vector at a preceding output time step, sequentially traversing the encoded representations according to the input order until an encoded representation is selected as a current context vector at the output time step, comprising, for each encoded representation that is sequentially traversed:
determining a selection probability for the encoded representation from the encoded representation and a hidden state of a decoder recurrent neural network for the preceding output time step;
determining whether to select the encoded representation as the current context vector in accordance with the selection probability; and
if the encoded representation is not selected as the current context vector, proceeding to a next encoded representation according to the input order;
after sequentially traversing the encoded representations to select the current context vector at the output time step:

processing the current context vector and a preceding output at the preceding output time step using the decoder recurrent neural network to generate a respective output score for each output in a vocabulary of outputs and to update the hidden state of the decoder recurrent neural network; and selecting the output at the output time step using the output scores;

wherein for one or more of the output time steps, sequentially traversing the encoded representations comprises:

sequentially traversing multiple encoded representations before an encoded representation is selected as the current context vector at the output time step, wherein the encoded representation that is selected as the current context vector at the output time step is separated from the encoded representation that was selected as the preceding context vector at the preceding output time step by at least one intervening encoded representation in the input sequence.

14. The system of claim 13, wherein the operations further comprise:

for the first output time step:
starting from a first position in the input order, sequentially traversing the encoded representations in the input order until an encoded representation is selected as a current context vector at the first output time step, comprising, for each encoded representation that is sequentially traversed:
determining a selection probability for the encoded representation from the encoded representation and an initial hidden state of the decoder recurrent neural network;
determining whether to select the encoded representation as the current context vector in accordance with the selection probability; and
if the encoded representation is not selected as the current context vector, proceeding to a next encoded representation according to the input order;
processing the current context vector and a placeholder output using the decoder recurrent neural network to generate a respective output score for each output in the vocabulary of outputs and to update the initial hidden state; and
selecting an output at the first output time step using the output scores.

15. The system of claim 13, wherein the operations further comprise:

in response to determining not to select any of the encoded representations at positions starting from the position in the input order of the encoded representation that was selected as a preceding context vector at a preceding output time step:
using a predetermined context vector as the current context vector at the time step.

16. The system of claim 13, wherein:
determining a selection probability for the encoded representation from the encoded representation and a hidden state of a decoder recurrent neural network for the preceding time step comprises:
determining an energy value for the encoded representation by processing the encoded representation and a hidden state of a decoder recurrent neural network for the preceding time step using an energy function; and
applying a sigmoid function to the energy value to determine the selection probability.

17. A non-transitory computer storage medium encoded with instructions that, when executed by one or more computers, cause the one or more computers to perform operations to generate a target sequence comprising a respective output at each of a plurality of output time steps arranged according to an output order from respective encoded representations of inputs in an input sequence arranged according to an input order, the operations comprising:

for each output time step after a first output time step in the output order, selecting an output at the output time step using monotonic attention over the encoded representations of the inputs, comprising:
starting from a position, in the input order, of the encoded representation that was selected as a preceding context vector at a preceding output time step, sequentially traversing the encoded representations according to the input order until an encoded representation is selected as a current context vector at the output time step, comprising, for each encoded representation that is sequentially traversed:
determining a selection probability for the encoded representation from the encoded representation and a hidden state of a decoder recurrent neural network for the preceding output time step;
determining whether to select the encoded representation as the current context vector in accordance with the selection probability; and
if the encoded representation is not selected as the current context vector, proceeding to a next encoded representation according to the input order;
after sequentially traversing the encoded representations to select the current context vector at the output time step:
processing the current context vector and a preceding output at the preceding output time step using the decoder recurrent neural network to generate a respective output score for each output in a vocabulary of outputs and to update the hidden state of the decoder recurrent neural network; and
selecting the output at the output time step using the output scores;
wherein for one or more of the output time steps, sequentially traversing the encoded representations comprises:
sequentially traversing multiple encoded representations before an encoded representation is selected as the current context vector at the output time step,
wherein the encoded representation that is selected as the current context vector at the output time step is separated from the encoded representation that was selected as the preceding context vector at the preceding output time step by at least one intervening encoded representation in the input sequence.

18. The non-transitory computer storage medium of claim 17, wherein the operations further comprise:
for the first output time step:
starting from a first position in the input order, sequentially traversing the encoded representations in the input order until an encoded representation is selected as a current context vector at the first output time step, comprising, for each encoded representation that is sequentially traversed:
determining a selection probability for the encoded representation from the encoded representation and an initial hidden state of the decoder recurrent neural network;

determining whether to select the encoded representation as the current context vector in accordance with the selection probability; and if the encoded representation is not selected as the current context vector, proceeding to a next encoded representation according to the input order;

processing the current context vector and a placeholder output using the decoder recurrent neural network to generate a respective output score for each output in the vocabulary of outputs and to update the initial hidden state; and selecting an output at the first output time step using the output scores.

19. The non-transitory computer storage medium of claim 17, wherein the operations further comprise:

in response to determining not to select any of the encoded representations at positions starting from the position in the input order of the encoded representation that was selected as a preceding context vector at a preceding output time step:

using a predetermined context vector as the current context vector at the time step.

20. The non-transitory computer storage media of claim 17, wherein determining a selection probability for the encoded representation from the encoded representation and a hidden state of a decoder recurrent neural network for the preceding time step comprises:

determining an energy value for the encoded representation by processing the encoded representation and a hidden state of a decoder recurrent neural network for the preceding time step using an energy function; and applying a sigmoid function to the energy value to determine the selection probability.

* * * * *